United States Patent [19]
Galuschak et al.

[11] 4,085,375
[45] Apr. 18, 1978

[54] COMBINED ANGULAR DISPLACEMENT MEASURING SYSTEM AND MULTIPLIER

[75] Inventors: George Galuschak, Hasbrouck Heights; Saul Leon Malkiel, Englewood, both of N.J.

[73] Assignee: The Singer Company, Little Falls, N.J.

[21] Appl. No.: 742,764

[22] Filed: Nov. 18, 1976

[51] Int. Cl.$^2$ .............................................. G01C 9/06
[52] U.S. Cl. ...................................... 328/160; 328/1; 33/366; 73/1 E
[58] Field of Search ............................ 73/1 E; 33/366; 328/160, 1

[56] References Cited
U.S. PATENT DOCUMENTS

| | | | |
|---|---|---|---|
| 3,096,591 | 7/1963 | Higgins et al. | 33/366 |
| 3,786,472 | 1/1974 | Scopacasa | 33/366 |
| 3,839,904 | 10/1974 | Stripling et al. | 33/366 |

OTHER PUBLICATIONS

Journal of Physics, vol. 7, No. 7, pp. 582–585, Jul. -1974, Article by McNaughton.

*Primary Examiner*—John S. Heyman
*Attorney, Agent, or Firm*—T. W. Kennedy

[57] ABSTRACT

A combined angular displacement measuring and multiplier system is provided which finds particular application in heading reference units for navigational purposes, but which has general utility, as will become apparent as the description proceeds. The system of the invention includes a bubble tilt or level sensor which measures angular displacements and which, in accordance with the present invention, also serves as a multiplier for a second term, such as azimuth rate ($\dot{AZ}$).

4 Claims, 7 Drawing Figures

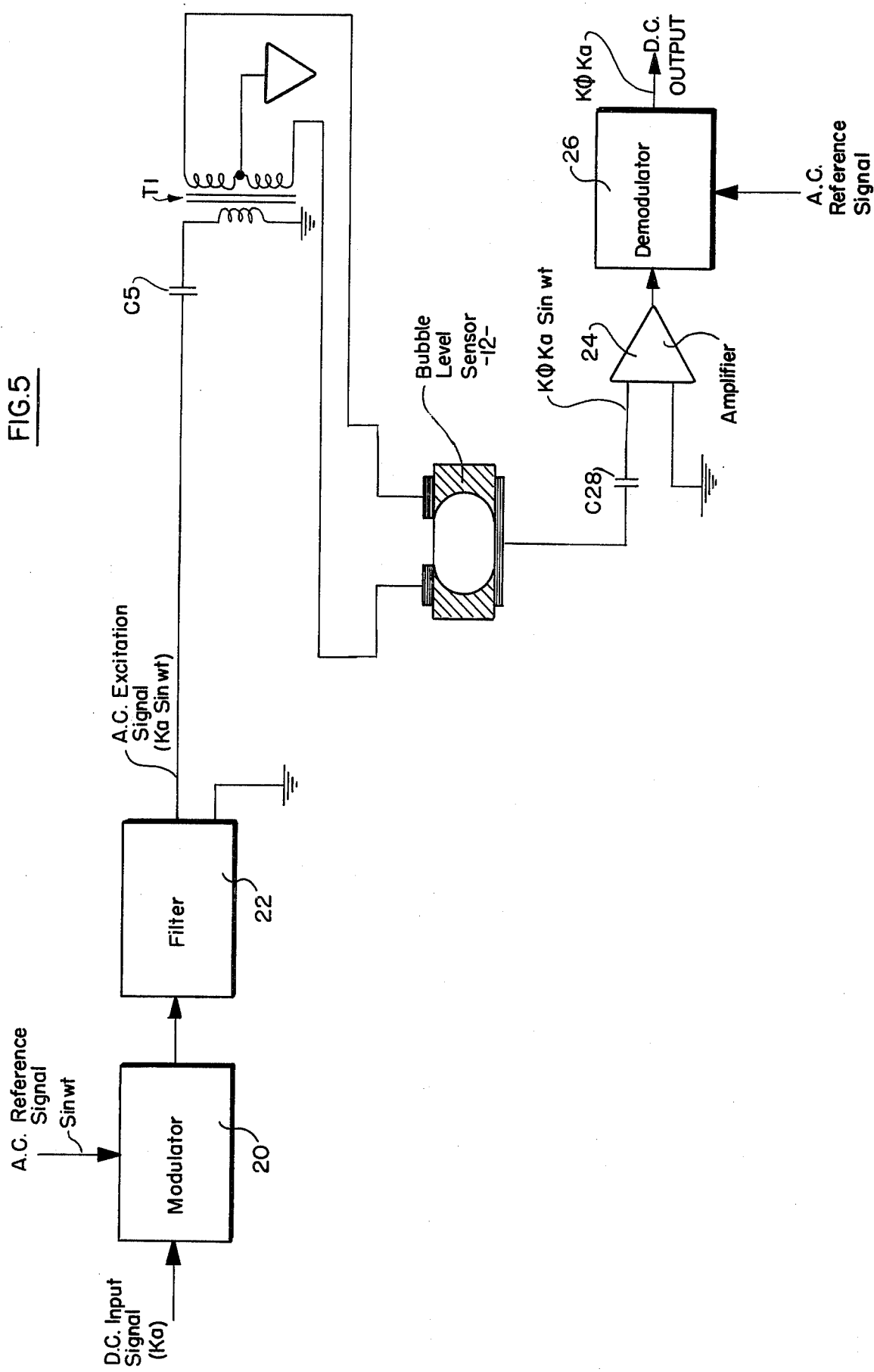

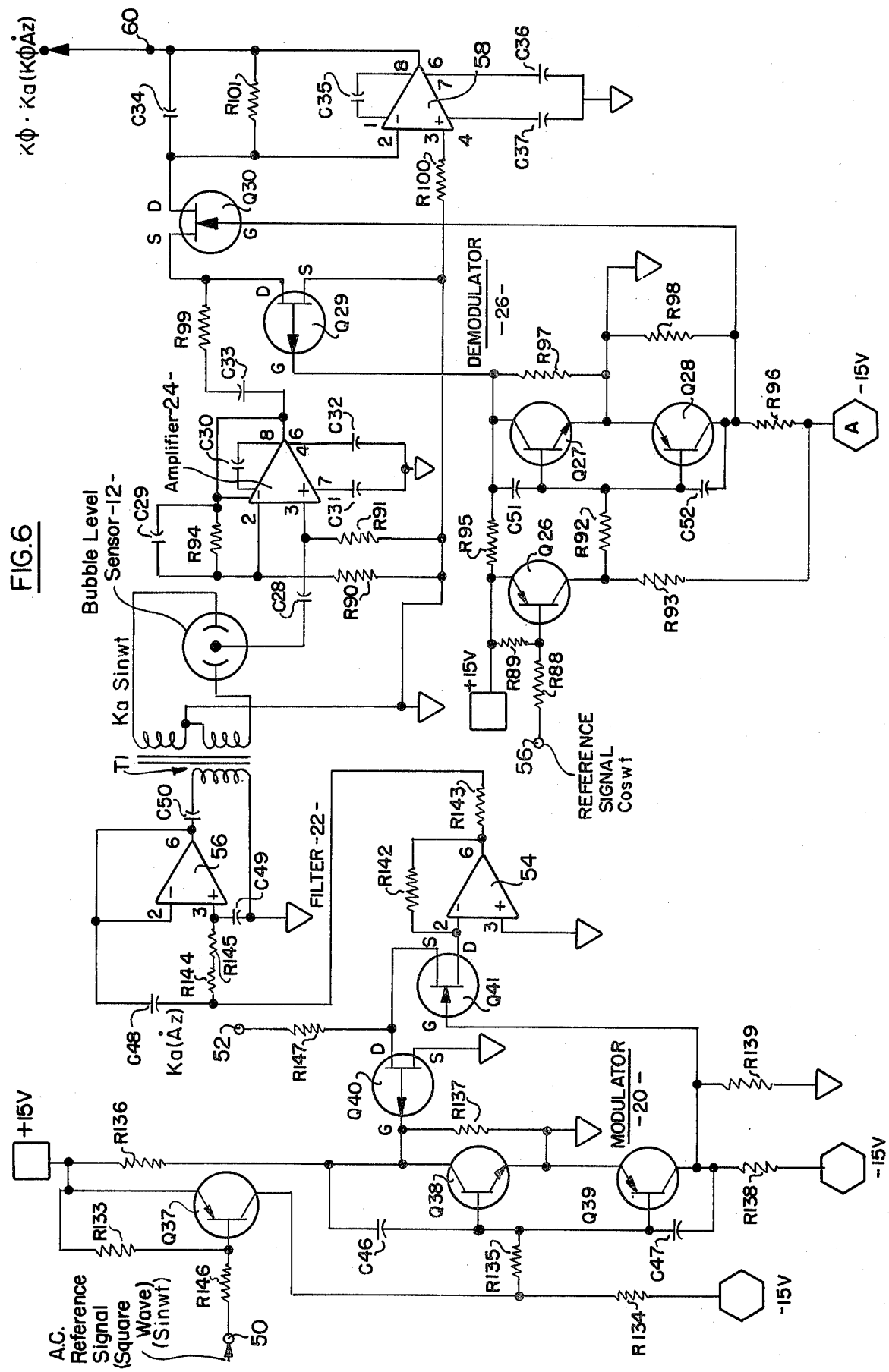

4,085,375

COMBINED ANGULAR DISPLACEMENT MEASURING SYSTEM AND MULTIPLIER

BACKGROUND OF THE INVENTION

Bubble-type electrolytic level sensors of the single-axis and two-axis type are presently in widespread use in guidance systems, missile launch systems, stable platforms, machine tool levelling systems, and the like. Such level sensors use a fluid as an electrolyte to detect variations from level about one or two axis, depending upon the type used. When connected in an appropriate bridge circuit excited by an AC voltage, the sensor output is a voltage whose magnitude is proportional to tilt angle, and whose phase (0° – 180°) indicates the direction of tilt.

In many navigational systems, such as in the case of heading reference systems, it is usual to multiply the output of a bubble level sensor by a second term, such as azimuth rate (AZ). This multiplication is formed in the prior art systems by a separate electronic multiplier which requires additional equipment and circuitry, and substantial expense if precise results are required. The electronic multiplier circuits require expert attention, since they must be calibrated and trimmed for proper operation.

In the system of the present invention, however, the multiplication is performed in the bubble level sensor itself, thus obviating the need for the separate and additional electronic multiplier. The resulting system of the invention is less complex and less expensive than the prior art systems, and it also eliminates errors inherent in the electronic multiplier, and it also obviates the need for trimming or calibration of the multiplier.

BRIEF DESCRIPTION OF THE DRAWINGS

FIG. 5 is a block diagram of a system involving the concepts of the invention; and FIG. 6 is a circuit diagram of a system similar in most respects to the system of FIG. 5.

DETAILED DESCRIPTION OF THE ILLUSTRATED EMBODIMENTS

As stated above, the present invention provides a simple system for performing multiplication of two terms using a bubble tilt or level sensor. As also explained, the bubble tilt or level sensor is a device which generates an AC signal proportional to angular displacement (or tilt) of the sensor. If an output signal is required which is the product of the angular displacement of the sensor and another independent external signal, the sensor is implemented in accordance with the teaching of the present invention so that its output is automatically a representation of its angular displacement multiplied by the external signal. Therefore, the sensor also serves as a multiplier, and this technique eliminates the need for an electronically implemented multiplier in the system.

Figure 1:
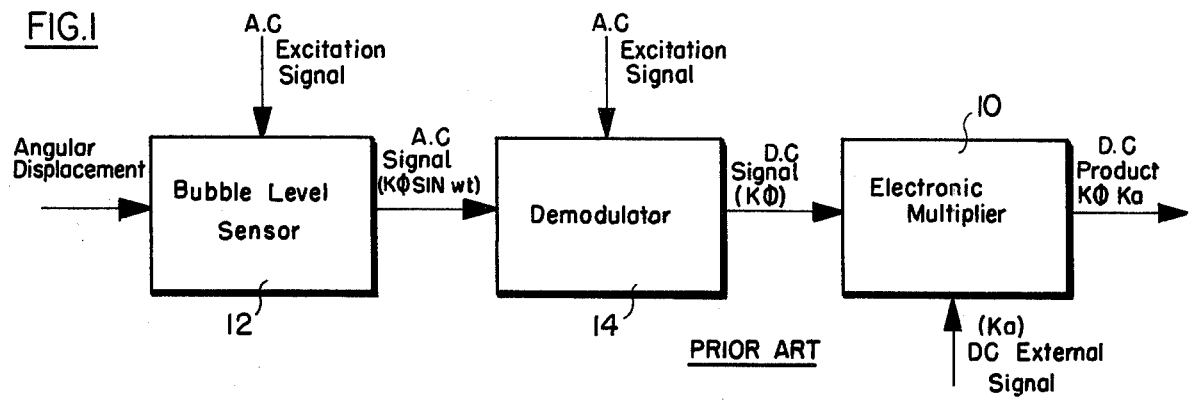
FIGS. 1, 2 and 3 are block diagrams showing various prior art systems which involve separate electronic multipliers for multiplying the output of the bubble level sensor with an additional term.

The block diagram of FIG. 1 illustrates one prior art system for performing the required multiplication of the angular displacement of the bubble level sensor and an external signal. The prior art system includes an electronically implemented multiplier 10 for multiplying two independent direct current signals. One direct current signal is the external signal (K$a$), and the other direct current signal is the alternating current output signal from the bubble level sensor 12 (K $\phi$ sin$\omega t$), which has been demodulated and converted to direct current (K $\phi$) by a demodulator 14. Demodulator 14 is a synchronous type demodulator, and it responds to an alternating current excitation signal of constant amplitude, and which is of the same frequency as the alternating current excitation signal introduced to the bubble level sensor 12.

Figure 2:
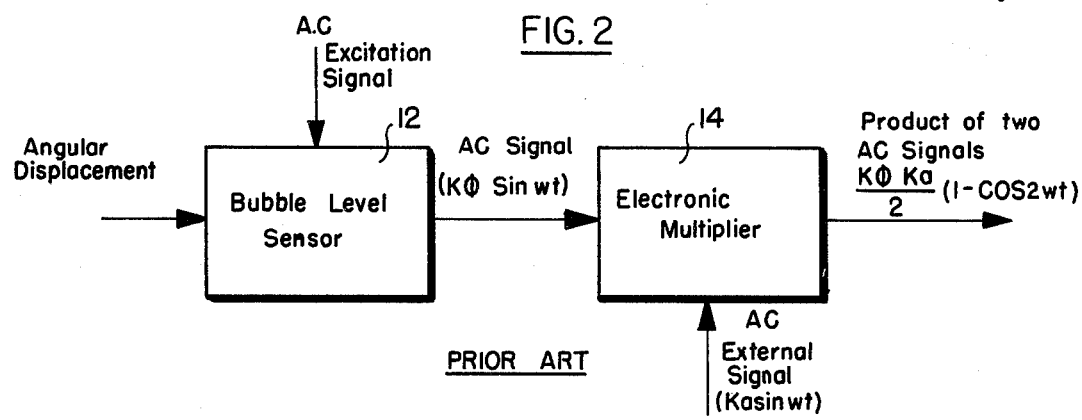
Figure 3:
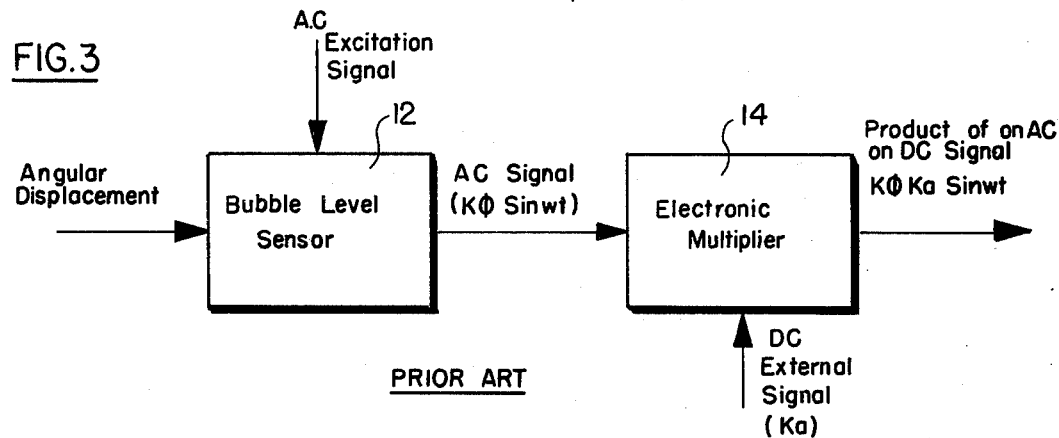

The prior art system of FIG. 2 shows how the same signals in alternating current format can be multiplied, again using an electronic multiplier 14, so as to produce an output signal which is the product of the two alternating current signals. The prior art system of FIG. 3, on the other hand, shows how the alternating current signal from the bubble level sensor may be multiplied in multiplier 14 by a direct current external signal to produce an output which is the product of an alternating current and a direct current signal.

The bubble level sensor 12 has the characteristic of yielding a scale factor (AC volts/angular displacement) proportional to its alternating current excitation signal. Thus, for a given alternating current excitation signal, and a given angular displacement, an alternating current signal of a particular amplitude is generated. If the alternating current excitation is reduced to one-half, the same angular displacement as specified above, the amplitude of the alternating current output signal will also be reduced to one-half.

Figure 4:
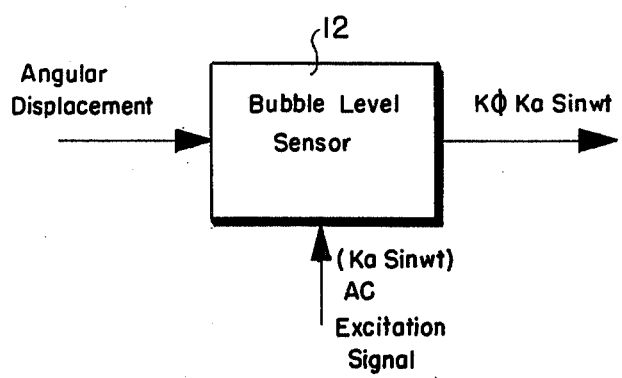
FIG. 4 is a block diagram showing the concept of the present invention in which the bubble level sensor itself is used to perform the additional multiplication function.

Therefore, in accordance with the present invention, and as shown in FIG. 4, the bubble level sensor itself may be used as a multiplier, by exciting the sensor with an alternating current external signal which is to be multiplied by angular displacement. The output of the sensor is automatically the product of the alternating current external signal and the angular displacement.

In the diagram of FIG. 5, the direct current input signal (K$a$) is modulated in a synchronous modulator 20 with an AC reference signal (sin$\omega t$), and the modulated signal is filtered in a filter 22 to provide the alternating current excitation signal (K$a$ sin$\omega t$) for the bubble level sensor 12.

The bubble level sensor is shown in schematic form and is excited by transformer $T_1$. The secondary of transformer $T_1$ has a grounded center tap, and the other two secondary wires are push-pull signals applied to the bubble level sensor 12. In this way, considering the bubble level sensor as a voltage divider, with no tilt, the circuit is balanced and the bubble sensor output is zero. With the tilt, the bubble sensor output is the product of the angular displacement and the alternating current equivalent of the direct current input signal (K$\phi$.K$a$ cos$\omega t$). The output signal is amplified in an amplifier 24, and demodulated in a demodulator 26 to produce a direct current output K$\phi$.K$a$. The demodulator 26 is a synchronous demodulator, and it uses the same reference signal as applied to demodulator 20. However, the reference signal applied to demodulator 26 is shifted 90° with respect to the reference signal applied to modulator 20, to compensate for similar shifts in the signals passing through the circuit associated with the bubble level sensor 12.

Figure 5A:
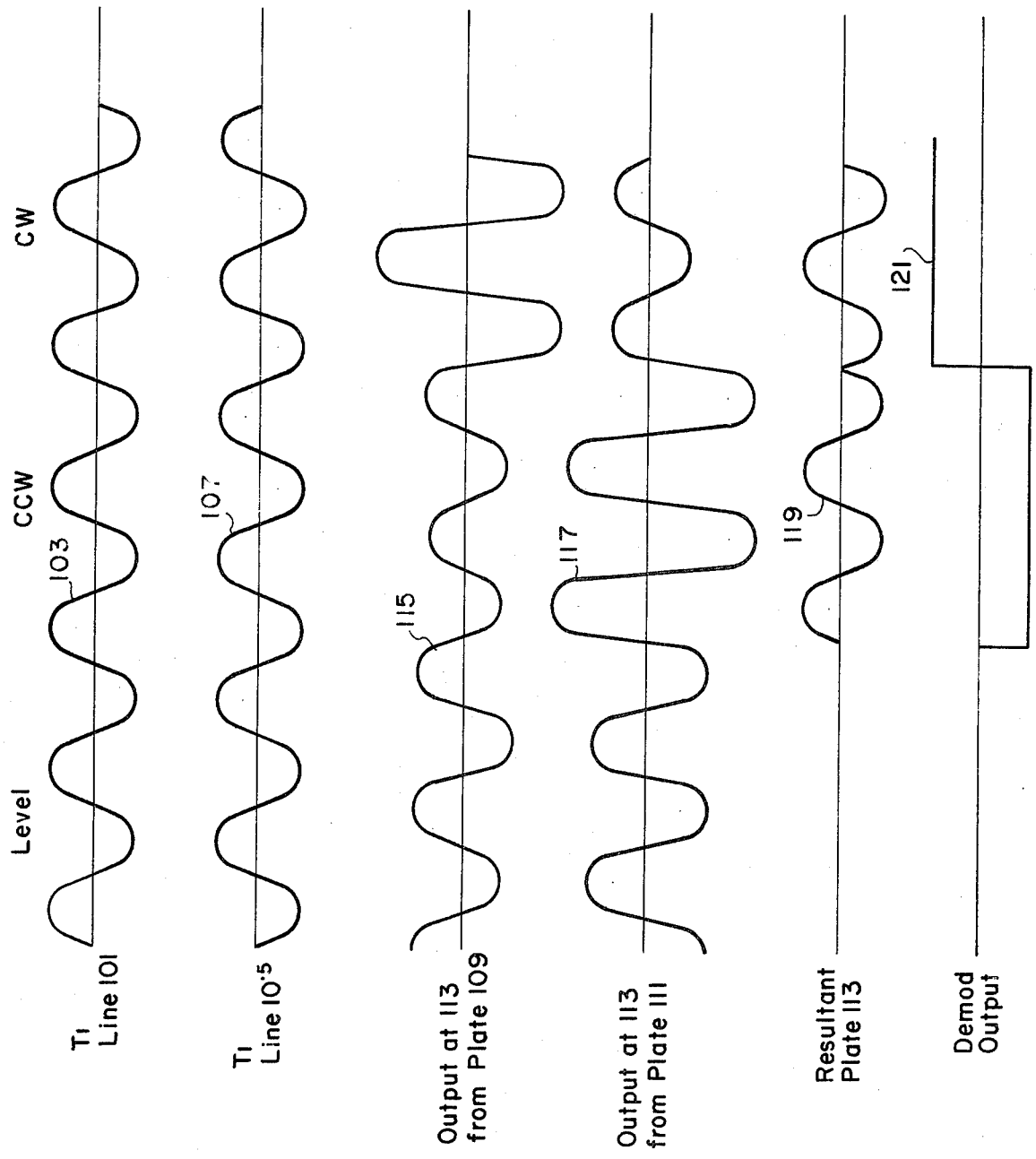
FIG. 5A is a wave form diagram helpful in understanding the operation of the system of FIG. 5.

FIG. 5A illustrates the various signals developed in the system of FIG. 5. The a-c signal K$a$ sin $\omega t$ fed to the primary of transformer T1 appears on the secondary output 101 as shown by the curve 103 of FIG. 5A. The output on line 105 is 180° out of phase therewith as shown by curve 107. These are the inputs to plates 109 and 111, respectively, of bubble sensor 12. The plates 109 and 111 are opposite a common plate 113 and thus the signal on plates 109 and 111 are capacitively coupled to plate 113. The amount of coupling depends on the dielectric constant. This in turn depends on the position of the bubble. As shown on FIG. 5A, when the bubble is level, the portion 115 of the signal from plate 109 appearing at plate 113 is equal in magnitude to the portion 117 from plate 111 since there is an equal dielectric constant at the two ends of sensor 12. Both signals are shifted 90° through the capacitor so formed. When summed at the plate 113, the resultant 119 is thus zero. After amplification and demodulation through amplifier 24 and demodulator 26, the final d-c output 121 K$\phi$K$a$ is zero.

If the bubble is tilted counter clockwise there will be air between plates 111 and 113 and liquid between plates 109 and 113. Thus, the signal 115 will become smaller and signal 117 larger. After summing, the resultant will have the phase of the larger signal 117. When demodulated in phase sensitive demodulator 26, the d-c signal will be negative with its magnitude a function of tilt.

If tilted clockwise, the signal 115 becomes larger and signal 117 smaller. Now the resultant 119 has the phase of signal 115 and the demodulator output signal 121 becomes positive.

The circuit of FIG. 6 includes an input terminal 50 which receives the alternating current reference signal (sin$\omega t$) which, in this instance is a square wave. Input terminal 50 is connected to the base of a PNP transistor Q37 through a resistor R146. The emitter of transistor Q37 is connected to the positive terminal of a 15-volt DC source, and the base is connected to that terminal through a resistor R133. The collector of transistor Q37 is connected through resistor R134 to the negative terminal of the 15-volt source, and the collector is connected through a resistor R135 to the base of an NPN transistor Q38, and to the base of a PNP transistor Q39. Transistor Q37 may be of the type designated 2N2907A, the NPN transistor Q38 may be of the type designated 2N2369A, and the PNP transistor Q39 may be of the type designated 2N5910.

The emitters of transistors Q38 and Q39 are grounded. The collector of transistor Q38 is connected to the positive terminal of the 15-volt source through a resistor R136, and is coupled back to the base through a capacitor C46. The collector of transistor Q39 is connected through a resistor R138 to the negative terminal of the 15-volt source, and is coupled back to the base through a capacitor C47. The collector of transistor Q38 is also connected to a grounded resistor R137 and to the gate electrode of a field effect transistor Q40, whereas the collector of transistor Q39 is connected to a grounded resistor R139 and to the gate electrode of a field effect transistor Q41. Transistor Q40 may be of the type designated 2N3378, and transistor Q41 may be of the type designated 2N3824. The DC input K$a$ (which, for example, is equal to AZ) to be modulated on the AC reference signal is introduced to the circuit by way of an input terminal 52. Terminal 52 is connected through a resistor R147 to the drain electrode of a field effect transistor Q40 and to the source electrode of field effect transistor Q41. The source electrode of transistor Q40 is grounded, and the drain electrode of transistor Q41 is connected to the negative input terminal of an operational amplifier 54.

The positive input terminal of amplifier 54 is grounded, and the output is connected back to the negative input terminal through a resistor R142. Operational amplifier 54 may be of the type designated LM307. The output of operational amplifier 54 is connected through resistors R143, R144 and R145 to the positive input of an operational amplifier 56 which, likewise, may be of the type designated LM307. Resistor R143 is also connected to a coupling capacitor C48 which is connected to the negative input of amplifier 56 and to the output. The positive input of amplifier 56 is connected to a grounded capacitor C49, and the output of the amplifier is coupled through a capacitor C50 to the primary winding of a transformer T1, the other side of which is grounded at its center tap.

In the operation of the circuit thus far described, the square wave input applied to terminal 50 is level shifted by the circuit of transistor Q37, and is amplified by the driver circuitry associated with transistors Q38 and Q39 to be applied to the field effect transistors Q40 and Q41 with appropriate phase. The field effect transistors act as switches, and effectively chop the DC input applied to terminal 52 at the frequency of the AC reference signal. The resulting modulated alternating current signal is passed through the circuitry of operational amplifiers 54 and 56, of which amplifiers 56 constitutes filter 22, to the coupling transformer T1, so that the modulated reference signal may be applied to the bridge circuit of the bubble level sensor 12.

The output of the bubble level sensor (K$\phi$.K$a$ cos$\omega t$) is introduced through a coupling capacitor C28 to the positive input of amplifier 24, which may be of the type designated LM301A. The positive input terminal of the amplifier is connected to a grounded resistor R91, and the output terminal is coupled through a capacitor C33, and through a resistor R99 to the source electrode of a field effect transistor Q30 and to the drain electrode of a field effect transistor Q29, the circuitry of which constitutes demodulator 26. Field effect transistor Q29 may be of the type designated 2N3378, and field effect transistor Q30 may be of the type designated 2N3824.

The alternating current reference signal (sin$\omega t$), shifted through 90° (cos$\omega t$), is applied to an input terminal 56. Terminal 56 is connected through a resistor R88 to the base of a PNP transistor Q26 which may be of the type designated 2N2907A. The circuitry of transistor Q36 operates as a level shifter to interface the demodulator circuit with the incoming reference signal. The emitter of transistor Q26 is connected to the positive terminal of the 15-volt source, and the base is connected to that terminal through a resistor R89. The collector of transistor Q26 is connected through a resistor R93 to the negative terminal of the 15-volt DC source.

The collector of transistor Q26 is connected through a resistor R92 to the base electrodes of a pair of driver transistors Q27 and Q28. Transistor Q27 is an NPN transistor which may be of the type designated 2N2369A, and transistor Q28 is a PNP transistor which may be of the type designated 2N5910. The collector of transistor Q27 is connected through a resistor R95 to the positive terminal of the 15-volt direct current source, and the collector of transistor Q28 is connected through a resistor R96 to the negative terminal of that source. A capacitor C51 is connected to the collector and base of transistor Q27, and a capacitor C52 is connected to the collector and base of transistor Q28.

The collector of transistor Q27 is connected to the gate electrode of field effect transistor Q29, and to a grounded resistor R97. The collector of transistor Q28 is connected to the gate electrode of field effect transistor Q30 and to a grounded resistor R98. The resulting direct current output from the field effect transistors is applied to a direct current amplifier 58, which may be of the type designated LM308A, and the output of the amplifier is introduced to an output terminal 60, at which the direct current output $K\phi \cdot Ka$ ($K\phi \dot{A} Z$) is produced.

The invention provides, therefore, a simple and efficient system whereby a bubble level sensor is used additionally as a multiplier, so that an output indicating angular displacement multiplied by an external term may be derived without the need for additional electronic multiplier circuits in the system.

It will be appreciated, of course, that although particular embodiments of the invention have been shown and described, modifications may be made. It is intended in the claims to cover all modifications which come within the true spirit and scope of the invention.

What is claimed is:

1. A combined angular displacement measuring and multiplier system comprising:
    a bubble-type level sensor responsive to an alternating current excitation signal for producing an output having an amplitude proportional to the amplitude of the alternating current excitation signal and to the angular displacement of the sensor from a reference level;
    modulator means coupled to said sensor for supplying said alternating current excitation signal thereto;
    first input circuit means coupled to said modulator means for supplying an alternating current reference signal thereto;
    second input circuit means coupled to said modulator means for supplying a second input signal thereto to be amplitude modulated on said alternating current reference signal; and
    an output circuit coupled to said sensor for deriving an output signal therefrom having an amplitude representative of the product of the angular displacement of the sensor from the reference level and the amplitude of said second input signal.

2. The combination defined in claim 1, in which said output circuit includes a demodulator for recovering said output signal.

3. The combination defined in claim 1, in which said second input signal is a direct current signal, and in which said output signal is a direct current signal having an amplitude representative of the amplitude of the input signal multiplied by the angular displacement of the sensor from said reference level.

4. The combination defined in claim 2, in which the modulator and demodulator are of the synchronous type, and which includes circuit means for introducing said alternating current reference signal to said demodulator in phase quadrature with said AC reference signal as applied to said modulator.

* * * * *